INVENTOR.
Everett C. Hutchins
By R R Candor
Attorney

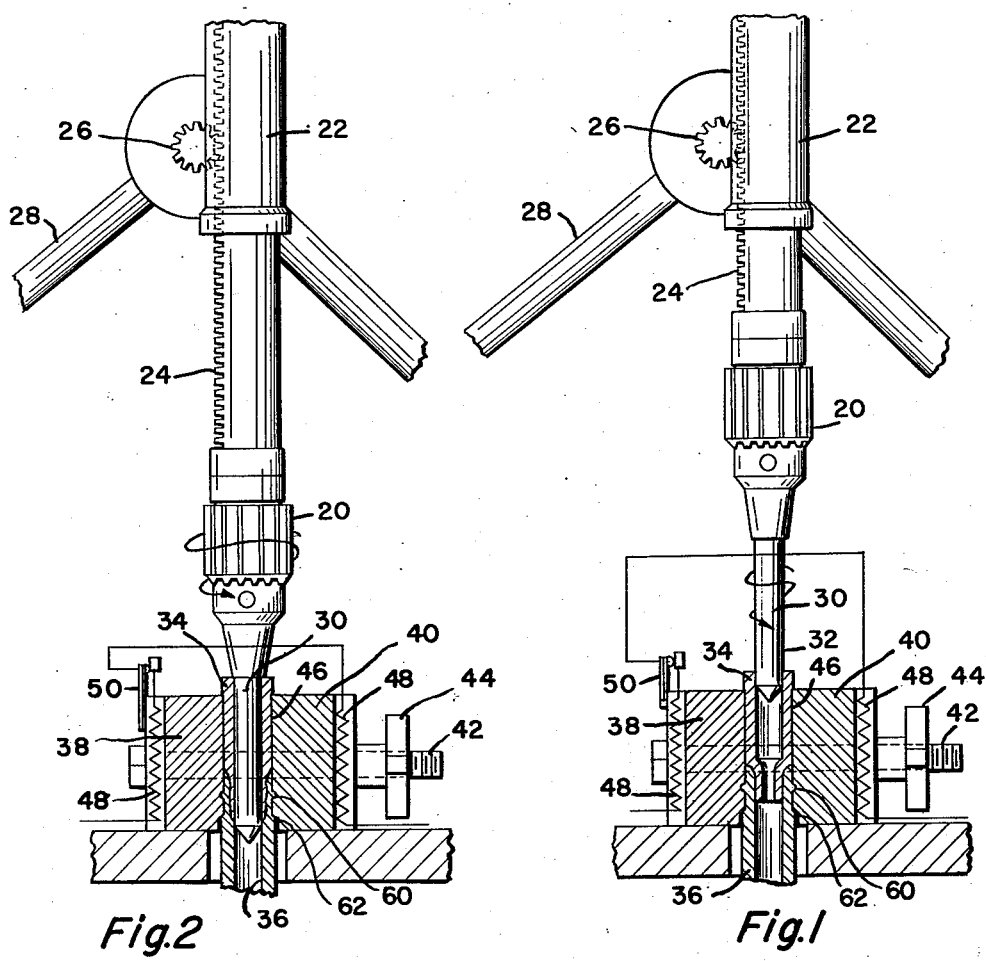

United States Patent Office 2,795,039
Patented June 11, 1957

2,795,039

METHOD OF FRICTIONALLY WELDING A TUBE TO A METAL OBJECT

Everett C. Hutchins, Dayton, Ohio, assignor to General Motors Corporation, Detroit, Mich., a corporation of Delaware Application February 15, 1954, Serial No. 410,379

5 Claims. (Cl. 29—470.3)

This invention is related in a general way to refrigerating apparatus but more particularly to a method of and apparatus for joining ductile tubing and to the joint made from such tubing.

While the joining of other common non-ferrous metals is comparatively easy, the joining of aluminum to aluminum and aluminum to other metals has been somewhat more difficult. This has been a retardant in the substitution of aluminum for other non-ferrous metals where many leak-tight joints are required such as the joining of tubing to tubing and to other containers for refrigerating systems and other applications. Since the cost of other common non-ferrous metals has increased much more rapidly than aluminum it is urgent that better, less expensive methods of making new and better joints be available for joining aluminum tubing and containers and aluminum tubing and containers to other metal tubing.

It is therefore an object of my invention to provide an improved method of and apparatus for employing heat and pressure for joining the ends of aluminum and other ductile tubing.

It is another object of my invention to provide an improved joint between two ends of aluminum tubing or aluminum tubing and other ductile metal which provides a substantially smooth uniform interior wall surface.

It is another object of my invention to provide an improved method of joining the telescoped ends of aluminum and other ductile tubing and aluminum tubing to containers which employs an outward or inward spinning or camming action for combing heat and pressure to weld the ends of the tubing together.

It is another object of my invention to provide an improved method of joining aluminum and other ductile tubing to another form of container by the use of friction developed heat and pressure.

These and other objects are attained in the first form shown in which the ends of the tubing are telescoped and firmly confined in a suitable die. While so confined a rotating tool having a diameter substantially equal to the interior diameter of the tube on opposite sides of the joint is rotated at a high speed and forced through the tubing to generate heat by friction and to spin or cam outwardly the overlapping portions of the joint to provide a substantially smooth bore and by the heat and resulting outward pressure to flow and weld the overlapped portions of the tubing into a firm gas-tight joint. External heat may be used to hasten the welding process.

In a second form of the invention, a hollow tool is rotated about the tubing in contact with the outer surface of the flared end to frictionally heat and press the flared end into a welded joint with a container or similar object.

Further objects and advantages of the present invention will be apparent from the following description, reference being had to the accompanying drawings, wherein a preferred form of the present invention is clearly shown.

In the drawings:

Figure 1 is a view, partly diagrammatic, showing the telescoped ends of the tubing in a die block mounted on a drill press provided with a rotating tool for welding the ends of the tubing;

Figure 2 is a view similar to Figure 1 showing the tool within the tubing as it is forming the welded joint;

Figure 3 is an enlarged sectional view showing the completed joint;

Figure 4:
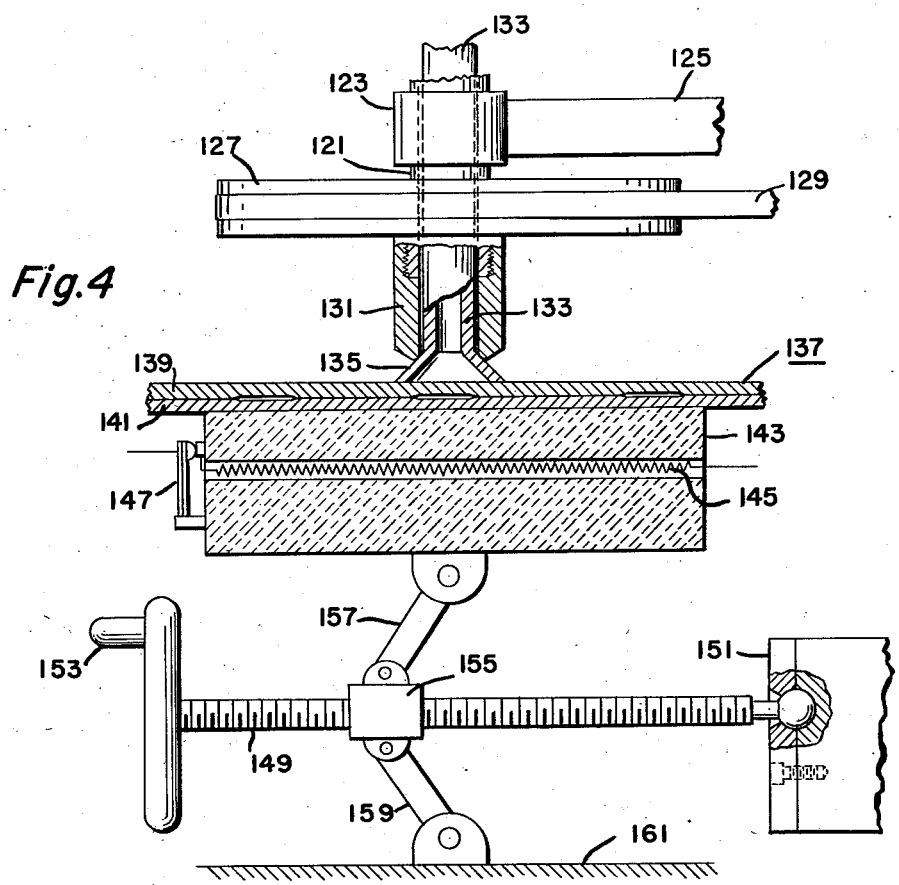
Figure 4 is a view in elevation, partly diagrammatic, of a second form of the invention in which the flared end of tubing is spun into a welded joint with a container.

Referring now to the drawings and more particularly to Figure 1 there is shown partly diagrammatically for the purpose of illustrating one apparatus and method of carrying out my invention a drill press provided with a rotating spindle having a drill chuck 20 at its lower end. The spindle is rotatably mounted in the spindle housing 22 provided with rack teeth 24 cooperating with a pinion 26 rotated by the handle 28 to raise and lower the spindle housing 22 and the chuck 20. The remaining parts of the drill press may be conventional and are not shown for that reason. The chuck 20 holds a rotating tool 30 having a piercing and outwardly camming nose 32 with such a contour that it will spin or cam the metal outwardly. The outer diameter of this tool 30 should be just slightly smaller than the interior diameter of the tubing beyond the joint.

For the purpose of illustrating my invention I have shown an upper piece of tubing 34 which may be of copper or aluminum and a lower piece of tubing 36 which may be of aluminum or some other ductile metal. The lower end of the upper piece of tubing is necked down and telescoped into the upper end of the lower tubing 36. The length of the overlap should be approximately equal to the diameter of the tubing. The joint of the tubing is firmly clamped within an annularly grooved aperture 46 between the die blocks 38 and 40 by a suitable bolt 42 and hand nut 44. The die blocks 38 and 40 may be either heated or cooled to maintain a suitable elevated die block temperature such as 350–375° F. by a suitable system such as electrical resistance elements 48 supplied with electrical energy under the control of an adjustable thermostat 50. The thermostat 50 may be adjusted by bending one of its parts.

The die blocks 38 and 40 are provided with upper and lower annular grooves 60 and 62. The upper groove 60 is approximately at the middle of the overlap or telescoped portion of the tubing while the lower groove 62 straddles the lower edge of the lap joint. These grooves assist in directing the flow of metal during the welding process to make a joint which has a better bond and no tendency to notch upon bending. The grooves 60 and 62 form the annular beads 64 and 66. The bead 64 is located substantially at the midportion of the joint while the bead 66 straddles the bottom of the joint.

In the specific example shown, the tubing has an outer diameter of about 5/16 of an inch and a wall thickness of less than 1/16 of an inch. The telescoping of the tubing provides an overlap with a double wall thickness. The tool 30 has an outer diameter of about 3/16 of an inch and rotates at a speed of about 6000 R. P. M. The peripheral surface of the tool has a linear speed of about 300 feet per minute. At lower speeds more pressure or force is required and at higher speeds less pressure or force is required to weld the joint. The tool is provided with a conical point but other forms of outward camming end surfaces may be used if desired. At such speeds, I find that a tool of high speed steel is practical, but other materials may be used. To accomplish the welding, the tool is lowered from the position shown in Figure 1 into the tubing as shown in Figure 2 and forced through the joint with sufficient rapidity that the heat and pressure softens the tubing at the joint and forces it outwardly to squeeze down the wall thickness at the joint. The heat formed by the frictional contact of the tool rotating at a high speed with the inner surface of the upper tubing heats the metal sufficiently and the nose of the tool provides sufficient outward camming force upon the metal that the frictional heat and pressure is sufficient to weld or bond the ends of the tubing together to provide a firm leak-tight joint.

Under some conditions welding and forming of the joint is hastened and improved by additional heat provided by heating the die blocks. My method provides a substantially smooth inner wall surface with a smooth uniform interior wall surface throughout the joined areas. The threaded surfaces of the die block resist axial movement and flow and aid in the distribution of the pressure to the metals to be joined to thereby assist in the welding process. Preferably the threads are circular and endless rather than helical. The circular nature of the threads aids in making the joint leak-proof.

If desired the aperture in the die block may be made smooth or roughened in other configurations. While the primary interest is in the joining of aluminum tubing, the process may be applied to the joining of other ductile tubing which may be welded or bonded together through heat and pressure.

Figure 5:
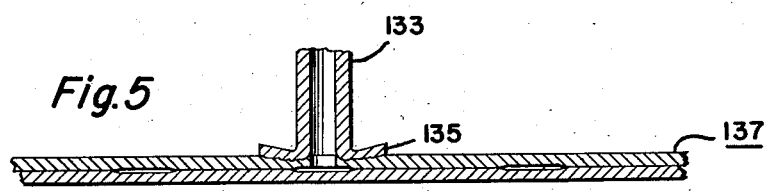
Figure 5 is a sectional view of the completed joint.
Figure 6:
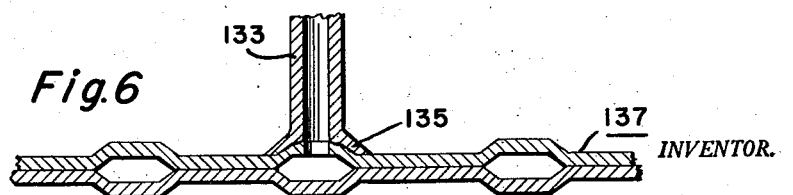
Figure 6 is a sectional view of the completed joint after hydraulic expansion of the container.

The second form of the invention relates to the joining of tubing to a container or other object. This method and apparatus is shown in Figures 4 to 6. In Figure 4 there is shown a sleeve 121 rotatably mounted in a bearing 123 on the end of the arm 125. Fixed to the sleeve 121 is a V grooved pulley 127 rotated by a V belt 129 at some suitable speed such as 5000 R. P. M. A hollow cylindrical spinning tool 131 is threaded or otherwise fastened to the lower end of the sleeve.

This spinning tool is hollow so that the tubing 133 may pass through the sleeve into tool 131. The end of the tubing 133 is flared as shown at 135. The spinning tool 131 is provided with a rounded lower edge which as it rotates bears against the outer surface of the flared end 135.

As one example of a container to which the tubing may be attached I show a roll bonded container 137 having an upper sheet 139 and a lower sheet 141 bonded together at their peripheral edges and at certain places in between as illustrated. This container 137 in its flattened form is supported upon a plate or table 143 which may be of ceramic material or stone or metal and it may be provided with a suitable electrical heater 145. This electrical heater 145 may be connected to a source of electric energy under the control of a suitable thermostat 147 to raise its temperature to some suitable temperature such as 300° F. to prevent heat loss to the plate from the joint to be formed. The plate 143 may be raised and lowered by the horizontal screw 149 having one end rotatably mounted in the stationary block 151 and its opposite end provided with a suitable crank 153. The screw 149 is provided with a traveling nut 155 connected to the upper and lower toggle links 157 and 159 connecting the base 161 and the plate or table 143.

In operation, the tubing 133 is threaded through the sleeve 121 and the tool 131 and provided with the outwardly flared end 135 as shown. The pulley 127 and the tool 131 are then rotated at a suitable speed of for example 5000 R. P. M. and the table or plate 143 is heated to a suitable temperature such as 300° F. The container 137 is placed on the table or plate 143 and the container 137 is moved into contact with the flared lower end of the tubing 133 and thence it is moved gradually upwardly so that the tool 131 frictionally contacts the outer flared surface at the lower end of the tubing 133 as shown in Figure 4. This frictionally heats the lower end of the tubing 133 and the gradual rise in the table or plate 143 applies increasing force between the rotating tool 131 and the flared end 135 of the tubing 133. This creates a great deal of friction which heats the flared end thereby softening it so that the flared end collapses and flattens against the upper surface of the container 137. Further upward movement of the table or plate 143 and the container 137 applies pressure along with the frictional heat developed sufficiently to press the flatten flared end of the tubing into firm welding engagement with the container 137 to form a joint such as is shown in Figure 5. As soon as the weld is made, the rotation of the tool is stopped, but the pressure is continued to allow the weld to cool until it has sufficient strength to be handled.

A hole may be drilled through the tubing in the upper member 139 of the container 137. If desired, however, this hole may be formed prior to the welding of the tubing to the container 137. By applying a liquid under high pressure to the tubing 133, the container 137 may be expanded hydraulically to the form shown in Figure 6 in which the passages between the sheets 139 and 141 are expanded to a satisfactory size. The tubing 133 and the container 137 may be of aluminum or copper or other ductile weldable metals or plastics or they may be of different materials such as aluminum and copper, brass or bronze.

While the form of embodiment of the invention as herein disclosed constitutes a preferred form, it is to be understood that other forms might be adopted, as may come within the scope of the claims which follow.

What is claimed is as follows:

1. The method of joining the ends of ductile tubing which includes telescoping the ends of the tubing to be joined, confining the outer surfaces of the tubing at and adjacent the telescoped ends, and rotating a tool at a surface speed of about 300 feet per minute and at the same time moving the tool axially through the interior of the tubing at the overlapping ends at a sufficient linear speed to frictionally heat and squeeze the telescoped ends radially into a firm welded joint, said tool having a diameter greater than the minimum diameter at the overlap.

2. The method of joining metal tubing to a metal object which includes flaring the end of the tubing and placing the flared end of the tubing in contact with the object, rotating a tool coaxially relative to the tubing with an annular contact surface in frictional contact with 360° of the outer surface of the flared end and at the same time moving the tool and the object toward each other and consequently generating sufficient heat and pressure until the flared end is flattened against and welded to the object.

3. The method of joining metal tubing to a substantially plane surface upon a metal object which includes placing the end of the tubing in contact with the substantially plane surface upon the object and rotating a tool having annular contact with the end portion of the tubing relatively to the object to spin and force the tubing into contact with the object and coincidentally generating sufficient heat for friction for combining sufficient heat and pressure to form a welded joint.

4. The method of joining the ends of ductile tubing which includes reducing in diameter one of the ends for a length greater than its internal diameter until it will telescope into the other end and telescoping the ends together for a length greater than the internal diameter of either end to overlap the ends, confining the outer surfaces of the tubing at and adjacent the overlapping ends, and forcing through the interior of the tubing at the overlapping ends a rotating tool having a diameter substantially equal to the internal diameter of the tubing beyond the overlapped ends at a sufficient rotational and axial speed to frictionally heat and soften the adjacent portions of the tubing and to squeeze and weld the ends together to form a firm gas tight joint.

5. The method of joining the ends of ductile tubing which includes telescoping the ends of the tubing to be joined, confining the outer surfaces of the tubing at and adjacent the telescoped ends, and forcing through the interior of the tubing at the telescoped ends a rotating tool having a diameter greater than the minimum diameter at the overlap of the telescoping portion rotating at a sufficient speed to frictionally heat and squeeze the telescoped ends radially until welded into a firm joint.

References Cited in the file of this patent

UNITED STATES PATENTS

| | | |
|---|---|---|
| 444,721 | Bevington | Jan. 13, 1871 |
| 790,470 | Woodrum | May 23, 1905 |
| 1,716,429 | Davies | June 11, 1927 |
| 1,776,615 | Boothman | Sept. 23, 1930 |
| 2,190,478 | Kleinknecht | Feb. 13, 1940 |
| 2,503,429 | Ziegler | Apr. 11, 1950 |

FOREIGN PATENTS

| | | |
|---|---|---|
| 572,789 | Great Britain | Oct. 24, 1945 |